Patented June 18, 1935

2,005,411

UNITED STATES PATENT OFFICE 2,005,411

SELENAZOLES AND PROCESS FOR PREPARING THEM

Leslie G. S. Brooker and Frank L. White, Rochester, N. Y., assignors to Eastman Kodak Company, Rochester, N. Y., a corporation of New York No Drawing. Application June 29, 1932
Serial No. 619,959

16 Claims. (Cl. 260—44)

This invention relates to a new class of bases, namely, 2-alkyl-selenazoles and methods for their preparation.

It is an object of our invention, therefore, to produce these new bases and to provide a method for their preparation. Other objects will appear hereinafter.

These bases are useful in the preparation of certain cyanine dyes in accordance with contemporary inventions of Leslie G. S. Brooker.

The 2-alkylselenazoles are of the following general structure:

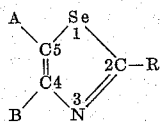

where A and B are univalent atoms or groups such as hydrogen, alkyl or aryl and R stands for an alkyl group such as methyl, ethyl, propyl or the like.

These bases (selenazoles) may be stated to be the products of the reaction of selenoamides of the aliphatic series with alpha-halogenated aldehydes or ketones of the following type $$\begin{array}{c} X-CH-C=O \\ | \quad | \\ A \quad B \end{array}$$

where A and B are monovalent substituent atoms or groupings, such as hydrogen, alkyl or aryl and X is halogen, such as chlorine or bromine. Examples of these compounds follow—

| | |
|---|---|
| ClCH$_2$CHO | monochloroacetaldehyde |
| ClCH$_2$COCH$_3$ | chloroacetone |
| BrCH$_2$CO C$_6$H$_5$ | phenacylbromide |
| BrCHCOC$_6$H$_5$<br>    \|<br>    CH$_3$ | alpha-bromopropiophenone |
| BrCHCOC$_6$H$_5$<br>    \|<br>    C$_6$H$_5$ | alpha-bromodesoxybenzoin |

The aliphatic selenoamides used are of the general formula R.CSe.NH$_2$ (or, to use the tautomeric form,

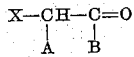

where R stands for an aliphatic grouping.

The reaction between bodies of these two types may be generalized as follows—

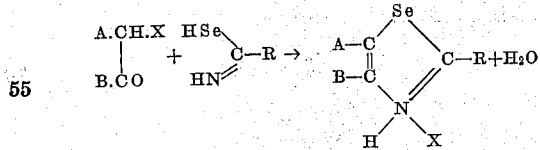

but it is not meant to suggest that the selenoamide actually or necessarily reacts in the particular tautomeric form shown above. The actual mechanism of the reaction is immaterial to our purpose, but it is desired to point out that the reaction involves equimolecular proportions of the two components of the reaction.

The preparation of the selenoamides described herein follows the method adopted by Kindler (see Kindler, Annalen, 1923, 431, 187) for selenoacetamide. If, for instance, selenopropionamide is desired, then the starting point of the synthesis is propionitrile instead of acetonitrile.

The preparation of the chloroacetaldehyde is that used by Hantzsch (see Ann., 1889, 250, 271.)

The reaction shown in generalized form above may be carried out with the two constituents undiluted or in the presence of a solvent such as one of the lower alcohols. The general practice is illustrated in the examples.

In general, the alpha-halogenated aldehyde or ketone is warmed in a vessel provided with a straight tubed reflux condenser (with or without solvent) and small portions of the aliphatic selenoamide are introduced down the condenser and the mixture shaken and heated until reaction occurs. A fresh portion of the selenoamide is then added and the process repeated and so on until one molecular equivalent of the selenoamide has been used up. It is in general desirable to employ a solvent such as ethyl alcohol where the alpha-halogenated aldehyde or ketone is a fairly high melting solid as the solvent provides a suitable medium in which reaction can occur.

The selenoamides as prepared by Kindler's method are conveniently crystallized from benzene, and are then best dried in vacuo and used as quickly as possible, since they are apt to deteriorate on keeping.

The bases are conveniently isolated from the reaction mixtures by treating these with an excess of alkali, whereby the bases are liberated, followed by steam distillation or by extraction by ether, the method used being adapted to the characteristics of the base being made. For instance, 2-methylselenazole was isolated after being distilled with steam, whilst 2,4-dimethylselenazole was extracted with ether. It is further recommended that the less volatile bases, e. g. 4-phenyl-2-methylselenazole, be purified by fractionation in vacuo, followed by crystallization in the case of solid bases.

The following examples will serve to illustrate the reaction, the parts being by weight.

EXAMPLE I

2-Methylselenazole 45 parts of anhydrous oxalic acid and 76 parts of chloroacetal were heated together at 125–130° C. for three hours giving rise to chloroacetaldehyde. The product was allowed to cool somewhat and then warmed gently on the steam bath as 61 parts of freshly prepared selenoacetamide was added in small portions with shaking, under reflux. The whole was heated at 100° C. for 20 minutes, cooled, acidified with dilute hydrochloric acid and filtered. The filtrate was made strongly alkaline with caustic soda and steam distilled. The distillate, the first portions of which are rich in base, was saturated with solid caustic potash and the base extracted with ether, the solvent evaporated off and the base purified by fractionation. The pure base was collected at 32–34° C. at 20 mm. and was a colorless liquid possessing an odour strongly reminiscent of the corresponding sulfur compound, 2-methylthiazole.

EXAMPLE II 2,4-Dimethylselenazole 23 parts of chloroacetone were diluted somewhat with 8 parts of absolute ethyl alcohol, the whole warmed gently on a water bath and 30 parts of freshly prepared selenoacetamide were added in several small portions with thorough shaking, each portion being allowed to react before the next was added. The whole was then heated at 100° C. for 15 minutes. The mass was cooled, shaken with 200 parts of water, the aqueous extract made strongly alkaline with caustic soda and the base extracted with ether. The ether layer was dried with anhydrous potassium carbonate, filtered, the solvent evaporated and the base distilled. The 2,4-dimethylselenazole distilled at 56–58° C. at 17 mm. It is a colorless liquid with an odour almost indistinguishable from that of 2,4-dimethylthiazole.

EXAMPLE III

4-Phenyl-2-methylselenazole 50 parts of phenacyl bromide (omega-bromo-aceto-phenone) were dissolved in 40 parts of absolute ethyl alcohol by heating on a steam bath under reflux. 30.5 parts of selenoacetamide were added to the solution in several small portions, each portion being allowed to react before the next was added. The whole was heated 30 minutes, cooled, 400 parts of water added and then made strongly alkaline with sodium hydroxide, and the base extracted with ether. The ethereal extract was dried over potassium carbonate and the solvent evaporated off. The residue was fractionated and low boiling impurities removed. The high boiling fraction was purified by recrystallization from petroleum ether, when the base melted at 63–64° C.

EXAMPLE IV

4-Methyl-2-ethylselenazole

A mixture of 17 parts of chloroacetone and 15 cc. absolute ethyl alcohol was warmed on a steam bath and 25 parts of freshly prepared seleno-propionamide added in small portions, each portion being allowed to react before the next portion was added. When all the selenopropionamide was added, heating was continued for 15 minutes. The reaction mixture was cooled, shaken well with 300 cc. of water, the whole made strongly alkaline with caustic soda and the 4-methyl-2-ethylselen-azole extracted with ether. The ethereal extract was dried over potassium carbonate, the ether removed by evaporation and the residue distilled. The 4-methyl-2-ethylselenazole passed over at 74–76° C. at 20 mm. The base was a colorless liquid with an odor resembling that of 2,4-dimethylselenazole.

It will be apparent to those skilled in the art that any 2-alkyl selenazole is contemplated by our invention, whatever may be the nature of the substituents occupying positions 4 and 5 in the selenazole molecule, and no matter by what method the bases are made.

Our method of preparation contemplates broadly the use of any alkyl selenoamide depending upon what alkyl it is desired to introduce into position 2 of the base, such for instance as methyl, ethyl, propyl, etc., it being necessary merely to employ the selenoamide corresponding to the desired alkyl. Furthermore, any alpha-halogenated ketone may be employed depending upon the group or atom desired in the 4,5 position of the desired base, i. e. by varying the atoms or groups A and B in the above type formula for the ketone, it will be observed from the type reaction that A and B in the finished base (selenazole) may be selected or provided as desired. The same is true in the case of the alpha-halogenated aldehydes wherein the atoms or groups A and B may be varied.

Having thus described our invention, what we claim as new and desire to secure by Letters Patent is:

1. A base of the structure—

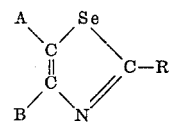

in which A and B represent hydrogen, an alkyl group, or an aryl group of the benzene series, and R represents an alkyl group.

2. A base of the structure—

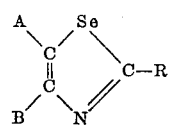

in which A and B represent hydrogen, an alkyl group, or an aryl group of the benzene series, and R represents a methyl group.

3. A base of the structure—

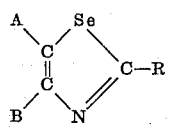

in which A and B represent hydrogen, an alkyl group, or an aryl group of the benzene series, and R represents an ethyl group.

4. A base of the structure—

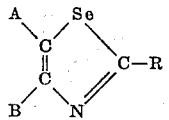

in which A represents hydrogen and B represents an alkyl group and R represents an alkyl group.

5. A base of the structure—

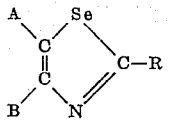

in which A represents hydrogen, B represents an aryl group of the benzene series and R represents an alkyl group.

6. A base of the structure—

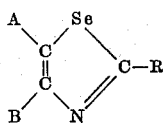

in which A represents hydrogen, B represents a methyl group and R represents a methyl group.

7. A base of the structure—

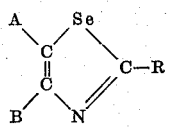

in which A represents hydrogen, B represents a phenyl group and R represents a methyl group.

8. A 2-methyl-selenazole.
9. A 2-ethyl-selenazole.
10. The process of preparing 2-alkylselenazoles which comprises reacting, under the influence of heat, an aliphatic selenoamide having the general formula R.CSe.NH₂, wherein R represents an aliphatic grouping, with a compound having the general formula

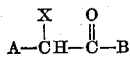

where A and B represent hydrogen, an alkyl group, or an aryl group of the benzene series, and X represents a halogen atom.

11. The process of preparing 2-alkylselenazoles which comprises reacting, under the influence of heat, an aliphatic selenoamide with an alpha-halogenated aldehyde of the general formula

where A represents hydrogen, an alkyl group or an aryl group of the benzene series and X represents a halogen atom.

12. The process of preparing 2-alkylselenazoles which comprises reacting, under the influence of heat, an aliphatic selenoamide with an alpha-halogenated ketone of the general formula

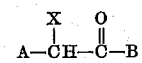

where A represents hydrogen, an alkyl group or an aryl group of the benzene series, B represents an alkyl group and X represents a halogen atom.

13. The process of preparing 2-alkylselenazoles which comprises reacting, under the influence of heat, an aliphatic selenoamide with an alpha-halogenated ketone of the general formula:

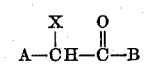

when A represents hydrogen, an alkyl group or an aryl group of the benzene series, B represents an aryl group of the benzene series and X represents a halogen atom.

14. The process of preparing 4-methyl-2-alkylselenazoles which comprises reacting, under the influence of heat, chloroacetone with an aliphatic selenoamide.

15. The process of preparing 2,4-dimethylselenazole which comprises reacting, under the influence of heat, chloroacetone with selenoacetamide.

16. The process of preparing 2-phenyl-4-alkylselenazoles which comprises reacting, under the influence of heat, phenacyl bromide with an aliphatic selenoamide.

LESLIE G. S. BROOKER.
FRANK L. WHITE.